United States Patent
Tsukagoshi

(10) Patent No.: US 9,438,895 B2
(45) Date of Patent: Sep. 6, 2016

(54) RECEIVING APPARATUS, TRANSMITTING APPARATUS, COMMUNICATION SYSTEM, CONTROL METHOD OF THE RECEIVING APPARATUS AND PROGRAM

(75) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 636 days.

(21) Appl. No.: 13/503,728

(22) PCT Filed: Nov. 11, 2010

(86) PCT No.: PCT/JP2010/070108
§ 371 (c)(1),
(2), (4) Date: Apr. 24, 2012

(87) PCT Pub. No.: WO2011/062110
PCT Pub. Date: May 26, 2011

(65) Prior Publication Data
US 2012/0206570 A1    Aug. 16, 2012

(30) Foreign Application Priority Data

Nov. 20, 2009 (JP) ................................. 2009-265395
Feb. 10, 2010 (JP) ................................. 2010-027581

(51) Int. Cl.
| | | |
|---|---|---|
| H04N 15/00 | (2006.01) | |
| H04N 13/00 | (2006.01) | |
| H04N 13/04 | (2006.01) | |
| G09G 3/00 | (2006.01) | |

(52) U.S. Cl.
CPC ...... *H04N 13/0438* (2013.01); *H04N 13/0011* (2013.01); *H04N 13/0452* (2013.01); *G09G 3/003* (2013.01)

(58) Field of Classification Search
CPC ..... G06T 15/10; G06T 11/001; G06T 11/20; G06T 15/00; G02B 27/22; H04N 13/0029; H04N 13/04; H04N 13/0454; H04N 13/0055; H04N 13/0452; H04N 21/234; H04N 13/0022
USPC ....................................................... 348/42–60
See application file for complete search history.

(56) References Cited

U.S. PATENT DOCUMENTS

| | | |
|---|---|---|
| 7,636,088 B2 | 12/2009 | Nomura et al. |
| 7,720,308 B2 | 5/2010 | Kitaura et al. |
| 7,889,196 B2 | 2/2011 | Nomura et al. |

(Continued)

FOREIGN PATENT DOCUMENTS

| | | |
|---|---|---|
| EP | 2352303 A1 | 8/2011 |
| JP | 09-027969 A | 1/1997 |

(Continued)

OTHER PUBLICATIONS

Supplementary European Search Report EP Application No. 10831505, dated Jan. 14, 2013.

*Primary Examiner* — Andy Rao
*Assistant Examiner* — Jared Walker
(74) *Attorney, Agent, or Firm* — Oblon, McClelland, Maier & Neustatd, L.L.P.

(57) ABSTRACT

The receiving apparatus according to the present invention includes a demultiplexer (104) that obtains video signal including data of image for right eye and data of image for left eye, a CPU (102) that obtains display control information included in the video signal, a digital tuner (126) that switches the video signal, and a 3D signal processing unit (130) that controls output of the video signal when switching the video signal based on the display control information.

7 Claims, 14 Drawing Sheets

(56) References Cited

U.S. PATENT DOCUMENTS

| | | | |
|---|---|---|---|
| 8,044,997 B2 | 10/2011 | Masuda et al. | |
| 2002/0122113 A1 | 9/2002 | Foote | |
| 2004/0090523 A1* | 5/2004 | Kondo et al. | 348/46 |
| 2007/0171277 A1* | 7/2007 | Shioi et al. | 348/54 |
| 2007/0236560 A1* | 10/2007 | Lipton et al. | 348/43 |
| 2008/0063386 A1* | 3/2008 | Oshima et al. | 386/125 |
| 2009/0244268 A1* | 10/2009 | Masuda et al. | 348/51 |
| 2011/0063421 A1* | 3/2011 | Kubota | 348/52 |
| 2011/0261160 A1 | 10/2011 | Tadokoro et al. | |

FOREIGN PATENT DOCUMENTS

| | | |
|---|---|---|
| JP | 09-138384 A | 5/1997 |
| JP | 11-164328 A | 6/1999 |
| JP | 2000-036969 A | 2/2000 |
| JP | 2003-045343 A | 2/2003 |
| JP | 2004-207773 A | 7/2004 |
| JP | 2004-349731 A | 12/2004 |
| JP | 2009-239388 A | 10/2009 |
| JP | 2010-199740 A | 9/2010 |
| WO | 2009077929 A1 | 6/2009 |
| WO | 2010-123053 A1 | 10/2010 |

* cited by examiner (1) Elementary Layer Syntax & Semantics
3D_RAP_Info Example Syntax

FIG.6
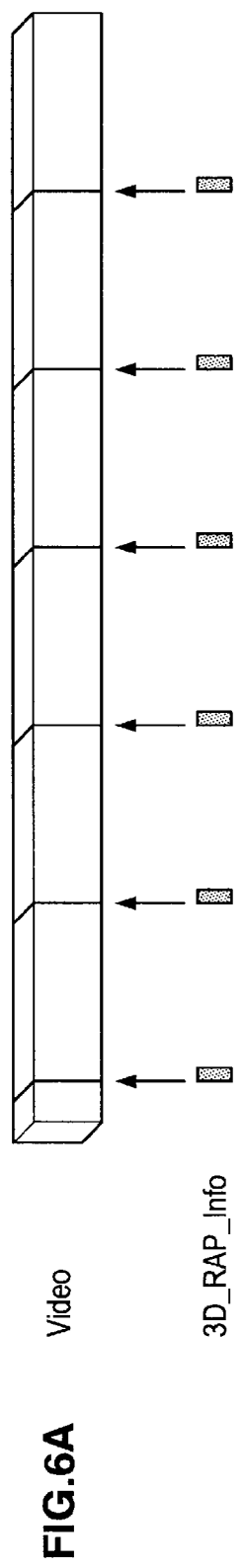
FIG.6A
SYNCHRONIZE WITH GOP OF ENCODED VIDEO OR INTRA PICTURE
Video
3D_RAP_Info
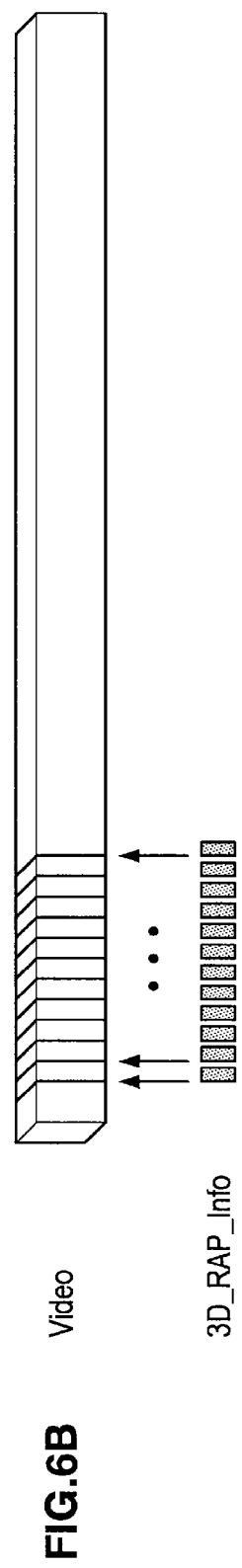
FIG.6B
SYNCHRONIZE WITH ENCODED PICTURE
Video
3D_RAP_Info

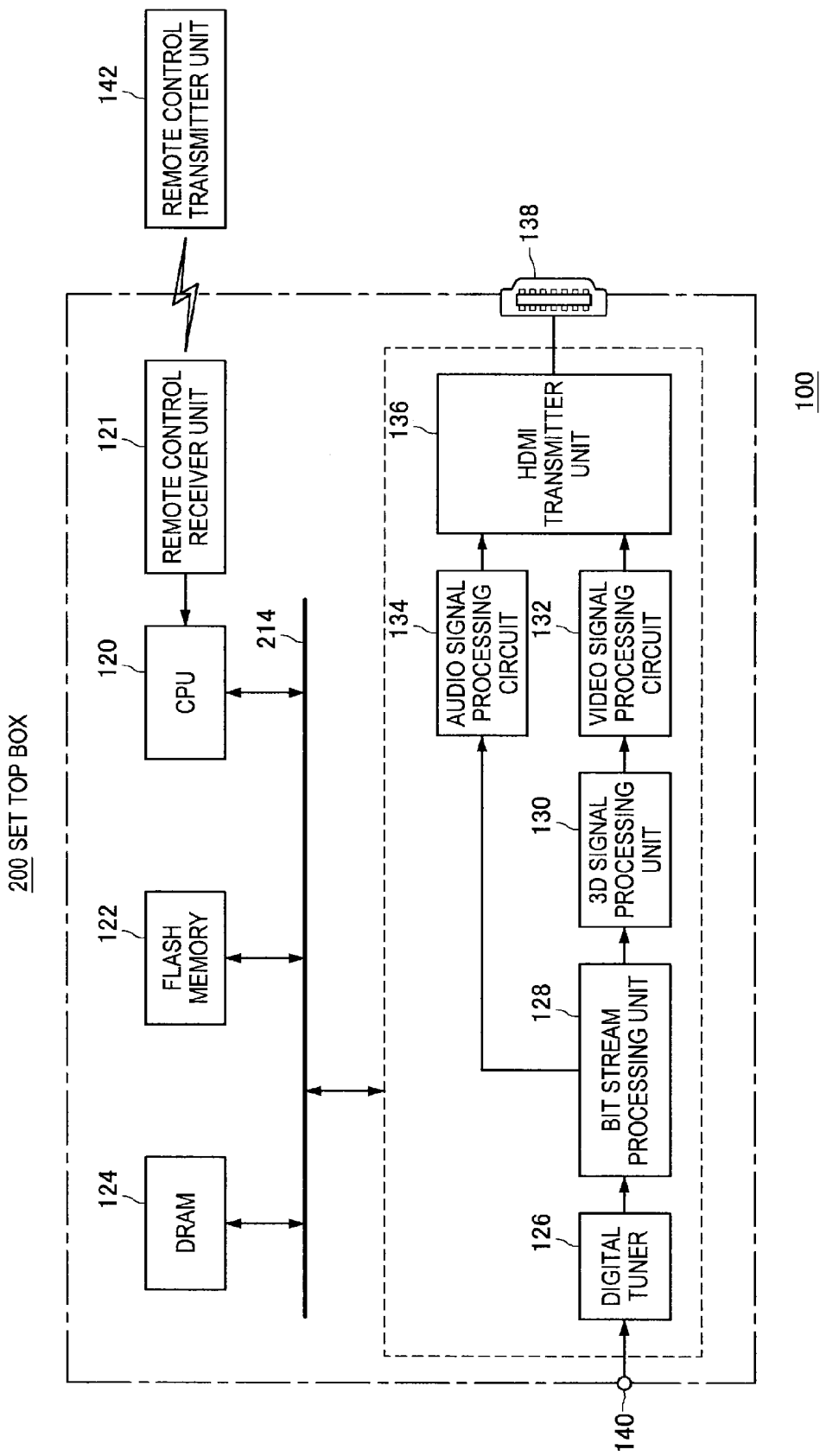

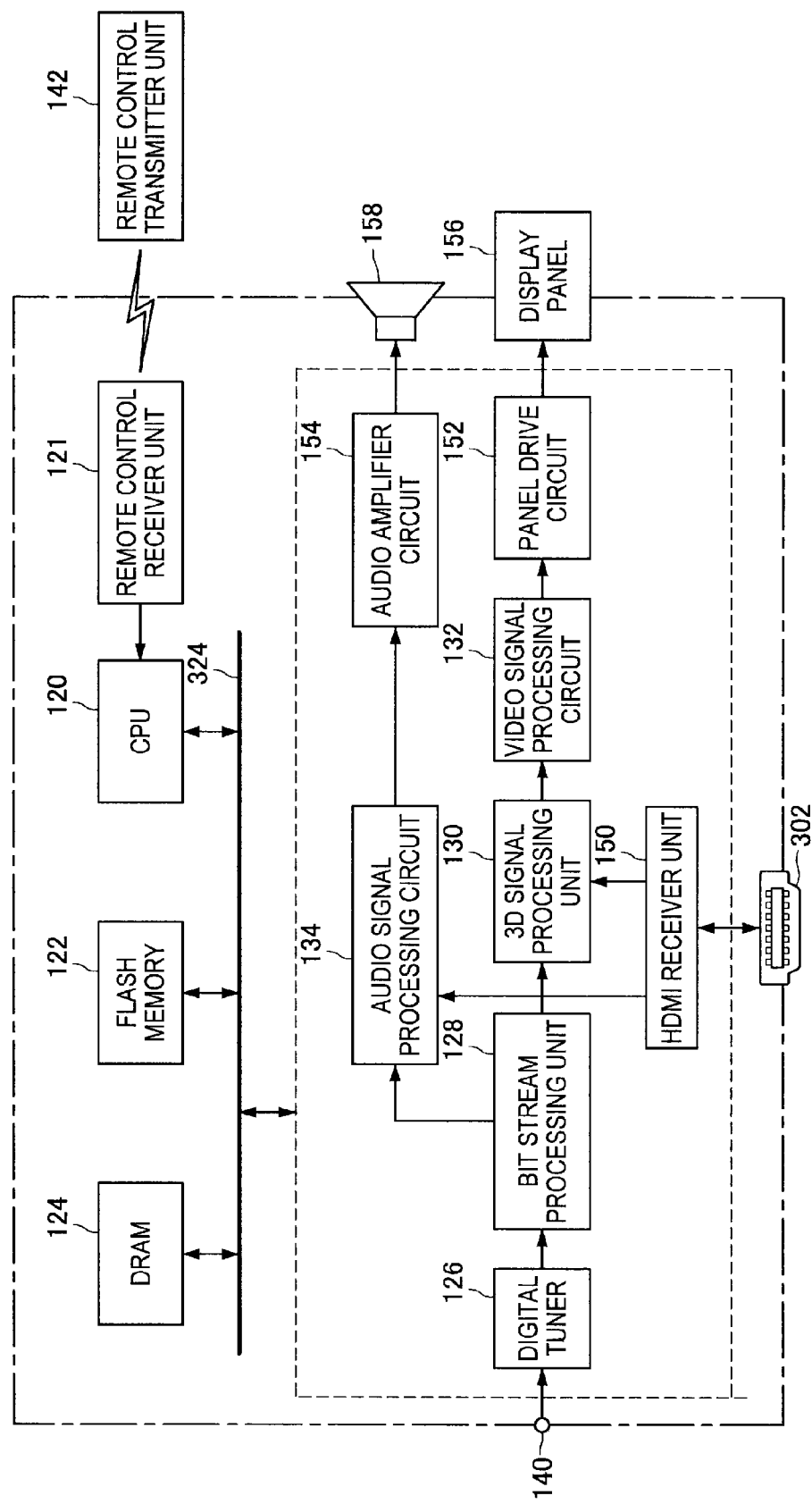

RECEIVING APPARATUS, TRANSMITTING APPARATUS, COMMUNICATION SYSTEM, CONTROL METHOD OF THE RECEIVING APPARATUS AND PROGRAM

CROSS-REFERENCE TO RELATED APPLICATION

The present application is a national phase entry under 35 U.S.C. §371 of International Application No. PCT/JP2010/070108 filed Nov. 11, 2010, published on May 26, 2011 as WO 2011/062110 A1, which claims priority from Japanese Patent Application Nos. JP 2009-265395 filed in the Japanese Patent Office on Nov. 20, 2009 and JP 2010-027581 filed in the Japanese Patent Office on Feb. 10, 2010.

TECHNICAL FIELD

The present invention relates to a receiving apparatus, a transmitting apparatus, a communication system, control method of the receiving apparatus and a program.

BACKGROUND ART

Conventionally, various systems have been well-known as a system that displays stereoscopic video. As described in following patent literatures 1 to 3, for example, there is a well-known method in which images for the left eye and the right eye having disparity are alternately supplied to a display at a prescribed period and observes the images with glasses having a liquid crystal shutter that is driven by synchronizing the images with a prescribed period.

CITATION LIST

Patent Literature

Patent Literature 1: JP H9-138384A
Patent Literature 2: JP 2000-36969A
Patent Literature 3: JP 2003-45343A

SUMMARY OF INVENTION

Technical Problem

When to view stereoscopic video contents transmitted from a broadcasting station after receiving the contents with a device such as a television set, it is assumed that a user selects one of a plurality of channels to view same as existing 2D (two-dimensional) video.

However, when switching channels, it is assumed that depth position (shooting out position) in 3D movie of the content before switching may differ from the depth position of the content after switching. For example, there may be a case where the video before switching is located behind from the display screen position, and the video after switching may be located in front of the display screen position.

When 3D video recorded in recording medium such as DVD is reproduced using a DVD reproducing apparatus, for example, it is assumed that the depth position in the video may be instantly changed in the random access such as so called fast-forwarding, rewinding, or putting out the head while editing.

In such case, since the depth position of the video changes momentarily at the time of switching the video, it may give the sense of incompatibility and the fatigue to the user who views the 3D video contents.

In light of the foregoing, the present invention aims to provide a receiving apparatus, a transmitting apparatus, a communication system, a method of controlling the receiving apparatus, and a program which is capable of preventing changes of depth position of video from giving a user incompatibility when stereoscopic image is switched to a different image.

Solution to Problem

According to an aspect of the present invention in order to achieve the above-mentioned object, there is provided a receiving apparatus that includes a receiving apparatus including a video signal obtaining unit that obtains a video signal including data of image for right eye and data of image for left eye, a display control information obtaining unit that obtains display control information that is included in the video signal, a signal switching unit that switches video signals based on a switching signal that specifies switching videos, and a video signal control unit that controls output of the video signal when switching the video signal based on the display control information.

Further, the display control information may be included in a codec layer that corresponds a multiplex layer of bit stream of the video signal or a frame of the video signal.

Further, the display control information may include at least one of information specifying a transition period at switching the video signal, information specifying which to output either the data of image for right eye or the data of image for left eye during the transition period, and information specifying ratio of the data of image for right eye and the data of the image for left eye to add to output during the transition period.

Further, the video signal control unit may output 2D video signal right after switching the video signal.

Further, the video signal control unit may output 2D video signal right after switching the video signal and cause the video signal to transition to 3D video signal.

Further, the video signal control unit may cause 3D video signal before switching to transition to 2D video signal right before switching the video signal.

Further, the video signal control unit may cause 2D video signal to transition to 3D video signal right after switching the video signal.

Further, the video signal control unit may include an adder that adds the data of image for right eye to the data of image for left eye at a prescribed ratio, and causes 3D video signal to transition to 2D video signal before the video signal is switched by changing the prescribed ratio in time series.

Further, the video signal control unit may include an adder that adds the data of image for right eye to the data of image for left eye at a prescribed ratio, and cause 2D video signal to transition to 3D video signal after the video signal is switched by changing the prescribed ratio in time series.

According to another aspect of the present invention in order to achieve the above issues, there may be provided a coding unit that codes a video signal including data of image for right eye and data of image for left eye in a prescribed format, a transmitting unit that transmits the coded video signal to a receiving apparatus, and a display control information inserting unit that inserts into the video signal with display control information to be used for controlling display when the video signal is switched on a side of the receiving apparatus.

According to another aspect of the present invention in order to achieve the above issues, there may be provided with a communication system including a transmitting apparatus including a coding unit that codes a video signal including data of image for right eye and data of image for left eye in a prescribed format, a transmitting unit that transmits the coded video signal to a receiving apparatus, and a display control information inserting unit that inserts into the video signal with display control information to be used for controlling display when the video signal is switched on a side of the receiving apparatus, and a receiving apparatus that includes a video signal obtaining unit that receives the video signal, a display control information obtaining unit that obtains the display control information that is included in the video signal, a signal switching unit that switches video signals based on a switching signal that specifies switching videos, and a video signal control unit that controls output of the video signal when switching the video signal based on the display control information.

According to another aspect of the present invention in order to achieve the above issues, there may be provided a method of controlling a receiving apparatus that includes a video signal obtaining unit that obtains a video signal including data of image for right eye and data of image for left eye, a step of obtaining display control information that is included in the video signal, a step of switching video signal based on a switching signal that specifies switching videos, and a step of controlling output of the video signal when switching the video signal based on the display control information.

According to another aspect of the present invention in order to achieve the above issues, there may be provided a program causing a computer to function as means of obtaining a video signal including data of image for right eye and data of image for left eye, means of obtaining display control information that is included in the video signal, means of switching video signals based on a switching signal that specifies switching videos, and means of controlling output of the video signal when switching the video signal based on the display control information.

Advantageous Effects of Invention

According to the present invention, it can be possible to prevent changes of depth position of video from giving a user incompatibility when stereoscopic image is switched to a different image.

BRIEF DESCRIPTION OF DRAWINGS

FIG. 6 is a schematic drawing that shows a place where each information is inserted during stream when transmitting image data by elementary stream of video.

FIG. 10 is a schematic drawing that shows 2D display after switching channels and revertive control from 2D to 3D by following fade-in.

FIG. 13 is a schematic drawing that shows a hardware configuration of the receiving apparatus.

FIG. 14 is a schematic drawing that shows a hardware configuration of the receiving apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
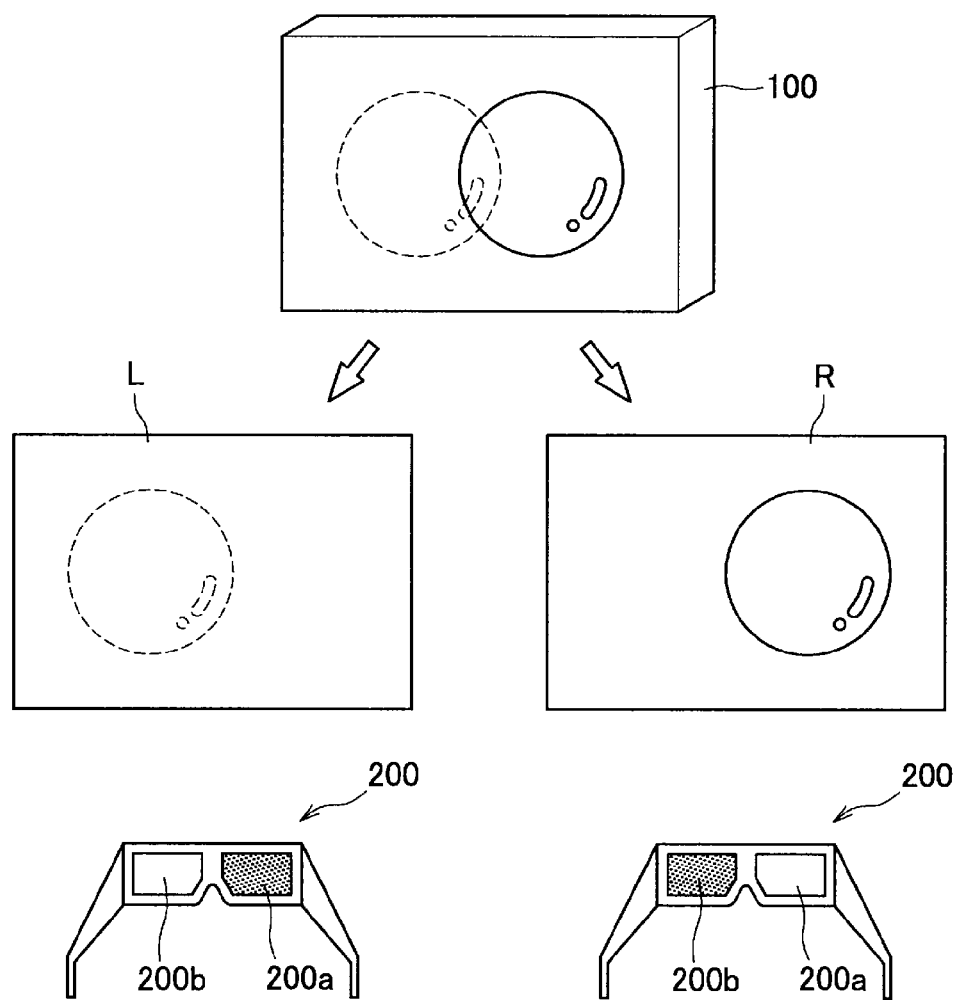
FIG. 1 is a schematic drawing that shows the configuration of a stereoscopic image display observing system according to an embodiment of the present invention.

The explanation will be given in the following order:
(1) System Configuration Example
(2) Changes In Depth Position Of Video Due To Channel Switching
(3) Overview Of Display Control At A Time Of Switching Videos According To The Present Embodiment
(4) Control Information For Display Control
(5) Configuration Example Of A Receiving Apparatus
(6) Display Control By The Receiving Apparatus
(7) Configuration Example Of A Transmitting Apparatus
(8) Hardware Configuration Example Of The Receiving Apparatus (1) System Configuration Example FIG. 1 is a schematic drawing that shows the configuration of a stereoscopic image display observing system according to an embodiment of the present invention. As shown in FIG. 1, a system according to the present embodiment includes a television set (receiving apparatus) 100 that includes a display panel configured from LCD, or the like, for example, and glasses for observing displayed image 200.

The receiving apparatus 100 is, for example, a stereoscopic video display apparatus of the time division type, which alternately displays image for left eye and image for right eye to the full screen at a very short period. Moreover, the receiving apparatus 100 provides images separated for left eye and right eye by synchronizing with a display cycle of video for left eye and video for right eye. The receiving apparatus 100 displays alternatively, for example, image for right eye R and image for left eye L for each field. The glasses for observing displayed image 200 is attached with a pair of crystal shutters 200a and 200b in a part corresponding to a lens. The crystal shutters 200a and 200b perform operations of open and close synchronizing with image switching for each field by the receiving apparatus 100. In other words, in a field where the image for right eye R is displayed in the receiving apparatus 100, the crystal shutter 200b for left eye is in a close-state while the crystal shutter for right eye is an open-state 200a. Moreover, in a field where the image for left eye L is displayed, an operation opposite to this is performed. Thus, the receiving apparatus 100 alternately displays the video for left eye L and the video for right eye R at a very short period to a full screen as well as synchronizing with display cycle of the video for left eye L and video for right eye R to separate the video for left eye and right eye to provide.

By such operations, an image for right eye R only incidents on a right eye of the user who views the receiving apparatus 100 using the glasses for observing displayed image 200, while an image for left eye L only incident on a left eye. For this reason, image for right eye and left eye are synthesized in the viewer's eye, and the image displayed on the receiving apparatus 100 is recognized sterically. Further, the receiving apparatus 100 may also display an ordinal 2-dimension image when the user does not use the glasses for observing displayed image 200, and in this case, the image for right eye R or the image for left eye L are not to be switched. Further, detail explanation will be given, however, the receiving apparatus 100 may display only one of the image for right eye R or the image for left eye L to the user with the glasses for observing displayed image 200 so as to let the user to be in visual contact with the 2D images.

Note that in FIG. 1, a system having the glasses for observing displayed image 200 is exemplified, however, the present embodiment is not limited to this, and may be applied to a system for observing stereoscopic image display which does not use the glasses 200, such as a polarizing plate type.

(2) Changes in Depth Position of Video Due to Channel Switching

The receiving apparatus 100 is a television set that receives the terrestrial digital broadcasting etc., receives and decrypts the bit stream of three dimensional video (3D video) composed of image for the left eye L and image for the right eye R mentioned above to display in a display panel. Moreover, the receiving apparatus 100 may also receive and decrypt the bit stream of two dimensional video (2D video) so as to display on a display panel. Here, as a format of 3D video, for example, there are systems such as side-by-side method, top and bottom method, and a frame sequential method as a 1HD method, or a method in which stereo view is to be coded in full resolution to be transmitted, as a 2HD method.

Broadcasting stations, etc, that are a providing side (production side) of video contents transmit the video contents from a transmitting apparatus. The user can receive the video contents from a plurality of broadcasting stations, and view a desired video content (a video program) by switching channels.

At this time, if the channel switching (switching programs) are performed at a timing that the content production side does not expect, differences in disparity between the right and left videos occur at a timing of switching, and focal point may be drastically changed at a moment, causing the sense of incompatibility in the user's vision or fatigue, etc.

Further, when 3D video transmitted in bit-stream from the transmission side is to be viewed, or when 3D video recorded in recording medium such as DVD is to be viewed, it is possible to operate such as so-called fast-forwarding or rewinding. In such a case where random access has been performed, differences in disparity between the right and left videos also occur at a timing of switching, and focal point may be drastically changed at a moment, causing the sense of incompatibility in the user's vision or fatigue, etc. Further, when the power of the receiving apparatus 100 is turned on (at starting up), if 3D video is displayed right after the start-up, it may give the sense of incompatibility and the fatigue to the use.

One of typical examples is a case where a channel switching is done using a remote controller or the like while recognizing 3D video of the receiving apparatus 100 in a state wearing the glasses for observing displayed image 200. In this case, if difference in disparity between a program of channel before switching and a program of channel after switching notably different, it is assumed that fatigue in vision will increases, or the user may receive a sense of being astonished.

Figure 2:
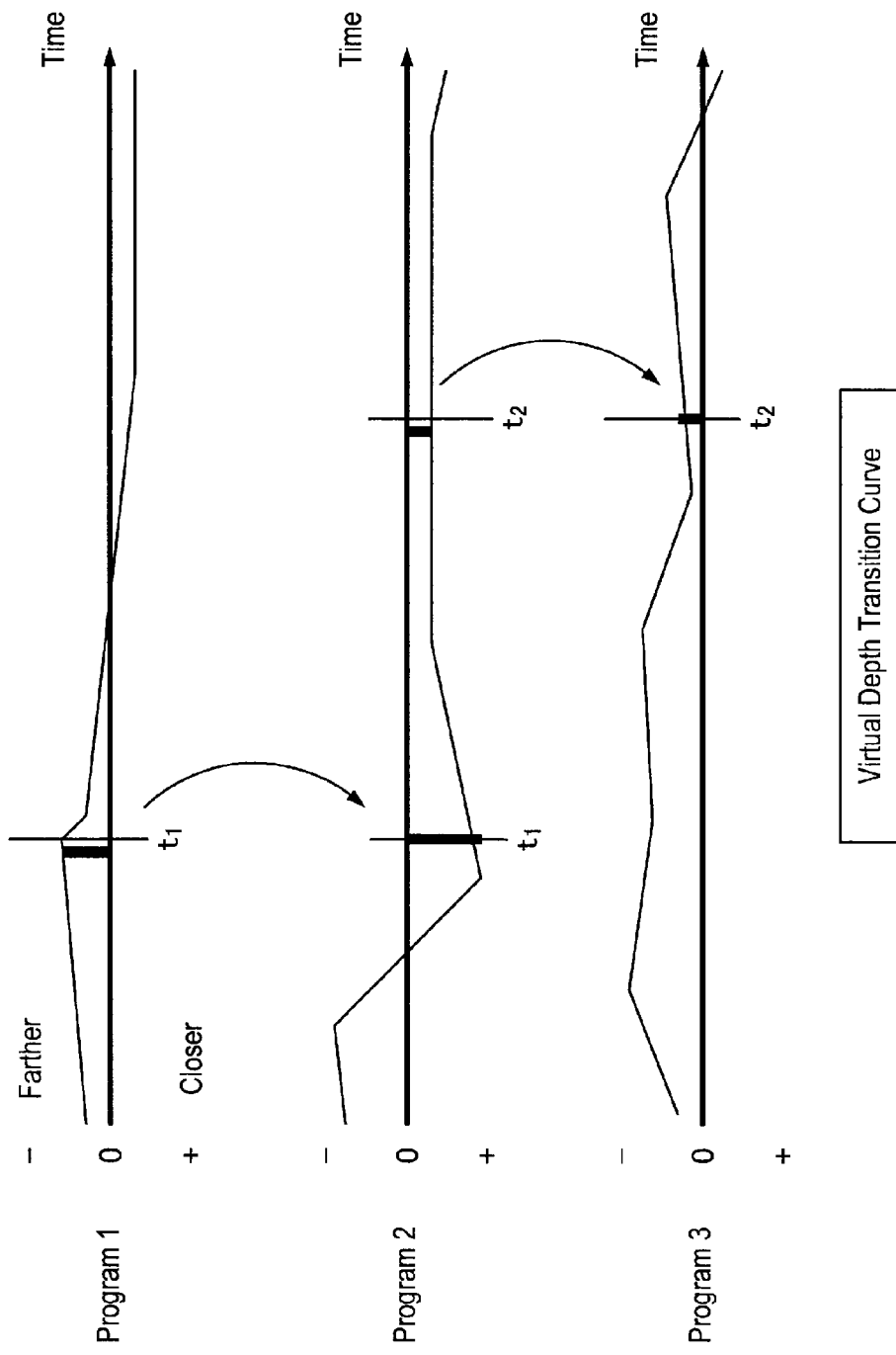
FIG. 2 is a timing chart that shows a case where a user switches channels between three different video programs 1 to 3.

FIG. 2 is a timing chart that shows a case where a user switches channels between three different video programs 1 to 3. An example shown in FIG. 2 shows that switching from program 1 to the to program 2 at time 1, and switching from program 2 to the program 3 at time 2.

In FIG. 2, horizontal axes indicate time while vertical axes indicate the depth position. When the depth position is minus (−) in the vertical axis, it shows the video seems to be located behind (more distant from the user than the display screen position). And when the depth position is plus (+), it shows the video seems to be located in front (closer to the user than the display screen position) of the display screen of the receiving apparatus 100. Waves in dotted line shown for each program in FIG. 2 indicate state how the depth position of the video changes as time elapses.

In FIG. 2, if the user switches from program 1 to program 2 at time t1, the video of program 1 is located behind from the screen position at time t1, while the video of program 2 is located in front of the screen position. Therefore, from the user side, since the image that exists behind the field of view is suddenly switched at time 2 to the front side, it is assumed that the user feels the sense of incompatibility and the fatigue. When program 2 is switched to program 3 at time t2, since the video existed in front of the screen position is switched to be located behind the display screen, it is also assumed that the user feels the sense of incompatibility and the fatigue in the same way.

Figure 3:
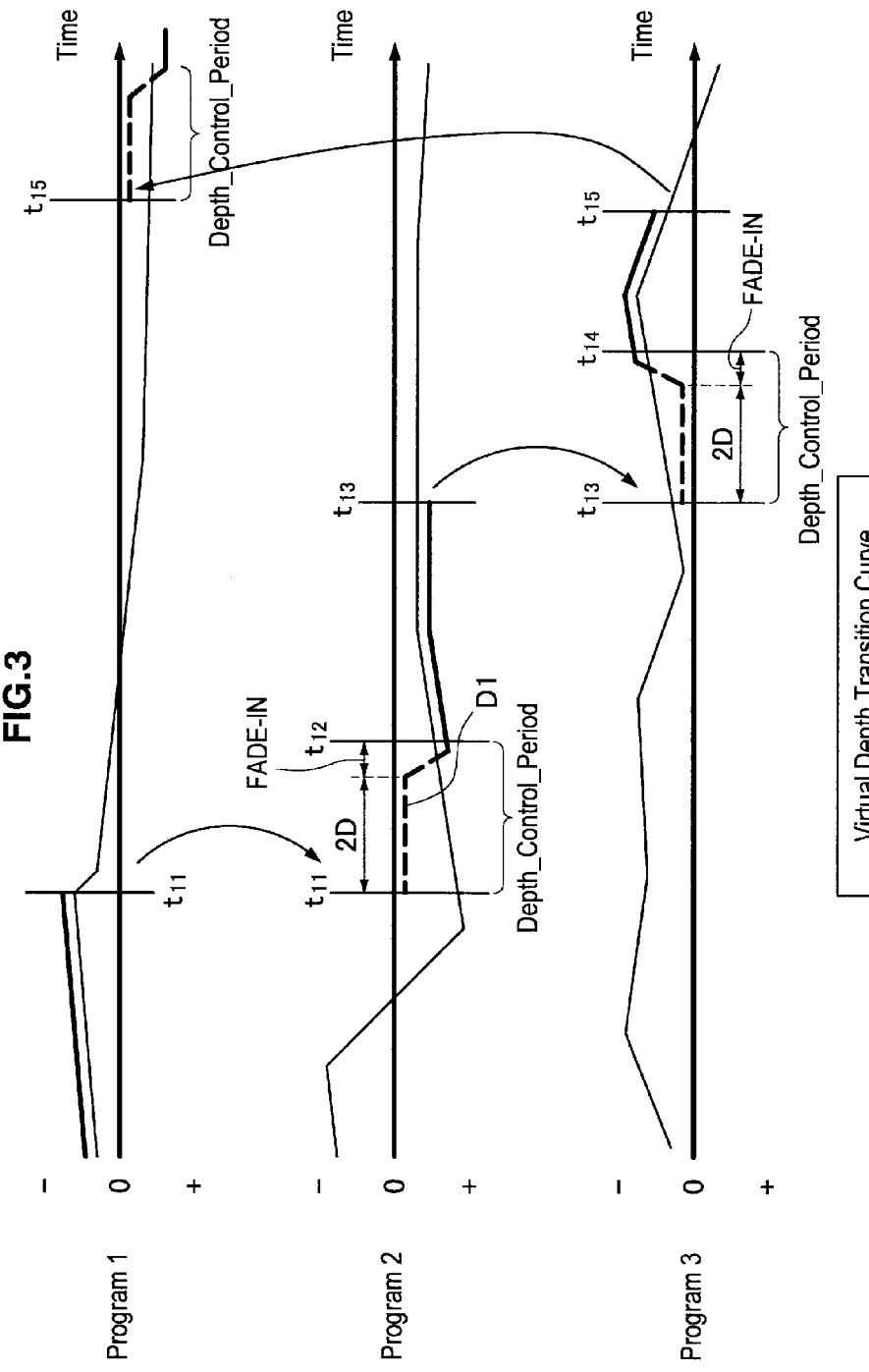
FIG. 3 is a timing chart that shows schematically display control at a time of channel switching.

(3) Overview of Display Control at a Time of Switching Videos According to the Present Embodiment For this reason, in the present embodiment, the 2D video is to be displayed only for a prescribed period of time right after the program has switched. Note that in the following explanation, display control when switching channel is shown as a major example, however, same processing is to be performed at a timing of switching video even when random access, such as fast-forwarding, rewinding, has been performed. In addition, display control same as at a time of switching is to be performed at a time of starting up the receiving apparatus 100. FIG. 3 is a timing chart that shows schematically display control at a time of channel switching according to the present embodiment. As shown in FIG. 3, when the channel is switched from program 1 to program 2 at time t11, as shown in a dashed line D1, the depth position of the video is set at a position on the display screen (depth=0) and 2D video is displayed right after t11. Note that in FIG. 3 the dashed line D1 is described slightly in a (+) side from position of depth=1) in order to make the drawing clear, however, the depth position of the video shown in the dashed line is assumed 0 (on the display screen).

Later, the video gradually transitions into 3D right before time t12, and returns back to a stereoscopic video of an original program 2 at time t12. Here, a period from time t11 to t12 is called a depth control period (Depth_Control_Period) for the depth position. Further, transition from 2D to 3D is called a period of fade-in.

Similarly in switching from program 2 to program 3, after switching channels at t13, 2D video indicated in dashed line is to be displayed, and a period from t13 to t14 is assumed to be a control period of the depth position. The 2D video of program 2 returns to the 3D display by fade-in. Moreover, similarly in switching from program 3 to program 1, after switching channels at t15, the 2D video indicated in dashed line is to be displayed, and 2D video of program 1 returns to 3D display by fade-in.

According to the display control at a time of program switching shown in FIG. 3, since display in 2D is performed right after the switching, the video located behind or in front of the display screen position is displayed temporarily as 2D video in the display screen position, and later, it returns to 3D display of program after switching. Therefore, subsequent program video will not be displayed as 3D video right after switching, and the position of video in depth direction will not change greatly. Thus, it is possible to completely avoid the user to feel a sense of incompatibility and the fatigue.

Figure 4:
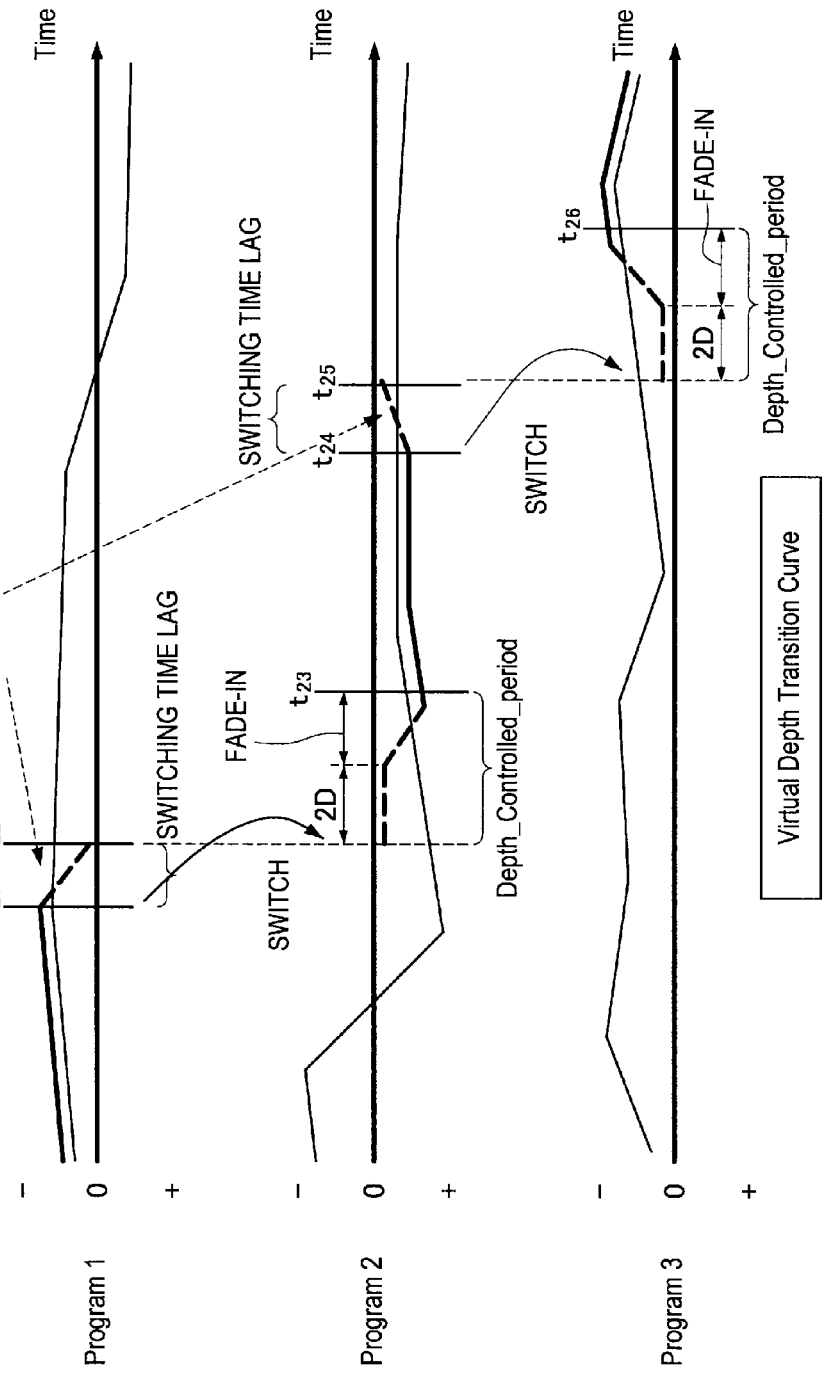
FIG. 4 is a schematic drawing that shows an example to transition to 2D by having a certain time lag at a time of switching and then to perform display control same as FIG. 3 by switching channels.

FIG. 4 shows a case where 3D video is not switched into 2D video right away at switching, but while maintaining channels in the same state, it is transitioned to 2D by having a certain time lag and then display control similar to FIG. 3 is performed by switching channels. Here, control to transition 3D video into 2D video in a period of time lag is called fade-out. When program 1 is switched into program 2, if channel switching is performed at time t21, program 1 remains to be displayed for a period until time t22, and the depth position is going to be slightly moved to the display screen position during this period. At time t22, the depth position of the video becomes a position of the display screen in 2D display. Subsequently, after displaying 2D video for a prescribed period of time, similarly to FIG. 3, the video is returned to 3D display of program 2 by fade-in (time t23). Similarly in switching from program 2 to program 3, when channels are switched at time t24, while maintaining the video display of program 2, it is gradually transitioned to 2D during the switching time lag until t25, and switched to subsequent channel 3 after becoming 2D. Subsequently, after displaying 2D video for a prescribed period of time, similarly to FIG. 3, the video is returned to 3D display of program 2 by fade-in (time t26). According to the above-mentioned control, since the display control by fade-out is performed during a period of switching time lag even at a time of transitioning to 2D, it can reduce the sense of incompatibility and the fatigue that the user feels at a time of switching.

At a time of random access, such as fast-forwarding or rewinding while reproducing video recorded in recording medium such as DVD or editing videos, similar control is performed so that 2D video is temporarily displayed at a time of switching videos, and that display control is performed by fade-in and fade-out. Thus, it becomes possible to prevent that disparity is suddenly changed at switching videos. Moreover, similar control is performed at a time of starting up the receiving apparatus 100 so that 2D video is temporarily displayed at a time of starting up, and that display control is performed by fade-in and fade-out. Since the time of starting-up is a timing when a state with no video displayed is switched into a state with video displayed, similar display control is performed as included in the switching videos. Thus, it becomes possible to prevent that video having disparity is suddenly displayed at a time of starting up. As described above, in the present embodiment, switching video signals means all of nonlinear video reproducing, including all concepts such as a time of starting reproducing initial video at starting up the receiving apparatus 100, a time of random access such as fast-forwarding and rewinding, or a time of accessing nonlinear reproducing point when trick-playing videos.

(4) Control Information for Display Control

Detail control information such as periods or timings for minimize disparity at a time of switching channels, random access, or editing point as described above are to be specified on the side of program transmitting, for example. This makes it possible to control disparity as broadcasting service or distribution service so as to have a method of transmitting desired 3D information. Specifically, the control information is to be transmitted via multiplex layer (TS (Transport Stream) layer), or codec layer, or the like, in the transmitting stream. In the present embodiment, such control information is called 3D_RAP_Info.

Figure 5:
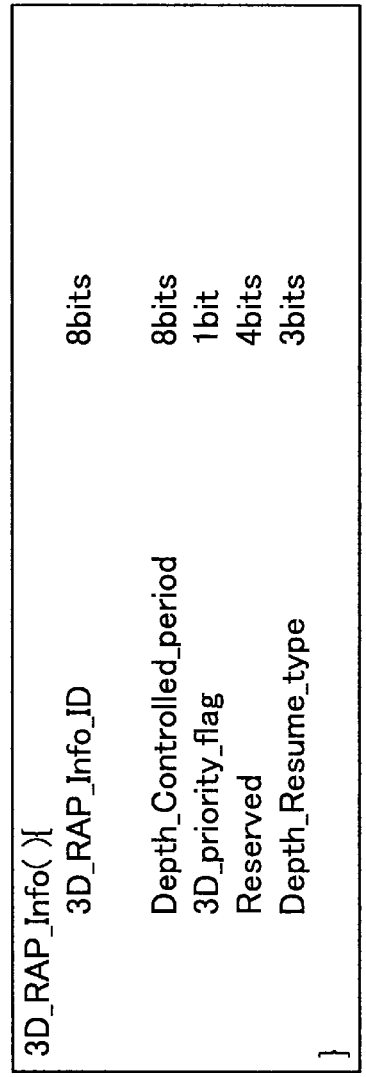
FIG. 5 is a schematic drawing that shows contents that control information specifies.

For example, there is a method of describing additional information named Supplemental enhancement information (SEI) in the H.264 standard of MPEG4. In the codec layer (Video Layer), information such as Depth_Controlled_period, 3D_priority_flag, and Depth_Resume_Type is sent to the random access reproducing such as after switching channels in SEI or user data (userdata) retion. FIG. 5 is schematic drawing that shows the contents that each information specifies.

Depth_Controlled_Period

Depth_Controlled_period is information that specifies the display period of 2D video at switching channels. The period is specified by the encoding stream of the video by the value of frame count (frame count) from the first displayed picture.

3D_Priority_Flag

3D_priority_flag is information that specifies which view of L or R to assume the display by Single View mentioned above.

Depth_Resume_Type

Depth_Resume_Type specifies the method how to start displaying when the display is started by the other view (alternative View) that is not the above-mentioned Single View after the period of Depth_Controlled_period beginning. It prevents that the disparity suddenly attaches from the state of 2D display, so as to achieve the effect of fade-in of the sense of depth to complete the disparity gradually.

000 Single View Only (View mixing) value α is set as a fixed value.

001 Linear Fade-IN (View mixing value α varies from 0% to 100% in Depth_Controlled_period evenly.

010 Only a single view is assumed to be (SingleView Only) in the first half of the period, and the latter half is assumed to be fade-in (Fade-In).

As mentioned above, the view mixing value α is a parameter to achieve the control of the fade-in or the fade-out, and this will be described in detail later.

FIG. 6 is a schematic drawing that shows a place where each information is inserted during stream when transmitting image data by elementary stream of video. The unit when transmitting can be sent by the unit of GOP that is a typical unit at the random access or be sent by each Intra picture.

FIG. 6(A) is schematic drawing that indicates an example that 3D_RAP_Info is inserted after synchronizing with GOP or intra picture of the encoding video. In this case, Depth_Controlled_period is automatically down-counted in the receiving apparatus 100 after being set by intra picture.

FIG. 6(B) is schematic drawing that indicates an example that 3D_RAP_Info is inserted after synchronizing with the encoding picture. In this case, Depth_Controlled_period is automatically down-counted in the receiving apparatus 100 after being set by the first displayed picture, or is specified as a down-count value in 3D_RAP_Info sent for each picture.

When control information is sent by the TS layer (multiplex layer), private data flag (Transport_private_data_flag) is raised in adaptation field (Adaptation Field) of transport stream (Transport Stream(TS)), and following 3D_flag is sent.

3D_flag 1 Video Elementary stream contains 3D format
0 Video Elementary stream does not contain 3D format Thus, as one example, it is shown that the video stream includes 3D format information when 3D_flag is "1", and that the video stream doesn't include 3D format information when 3D_flag is 1.

As another method of inserting this control information, for example, it is also possible to define above-mentioned Syntax by raising PES_extension_flag in PES packet, and raising PES_private_data_flag at the same time.

Note that the receiving apparatus 100 that has detected information "3D_flag=1" recognizes that there is 3D_RAP_Info in video elementary stream to analyze the information. If 3D_flag=1 in the program before switching when the channel switching occurs, fade-out of disparity of the program before channel switching is performed until the time point when new program can be displayed after channel switching.

Note that matching the time lag occurred in the receiver system until the output when channel switching, view mixing value α at fade-out can be set so that a changed portion of each picture is fixed in all program in order to complete changes within a prescribed time as a guide. On the other hand, when displaying program after channel switching, the disparity is controlled according to 3D_RAP_info of the ES layer, which is set for each program.

(5) Configuration Example of a Receiving Apparatus

Figure 7:
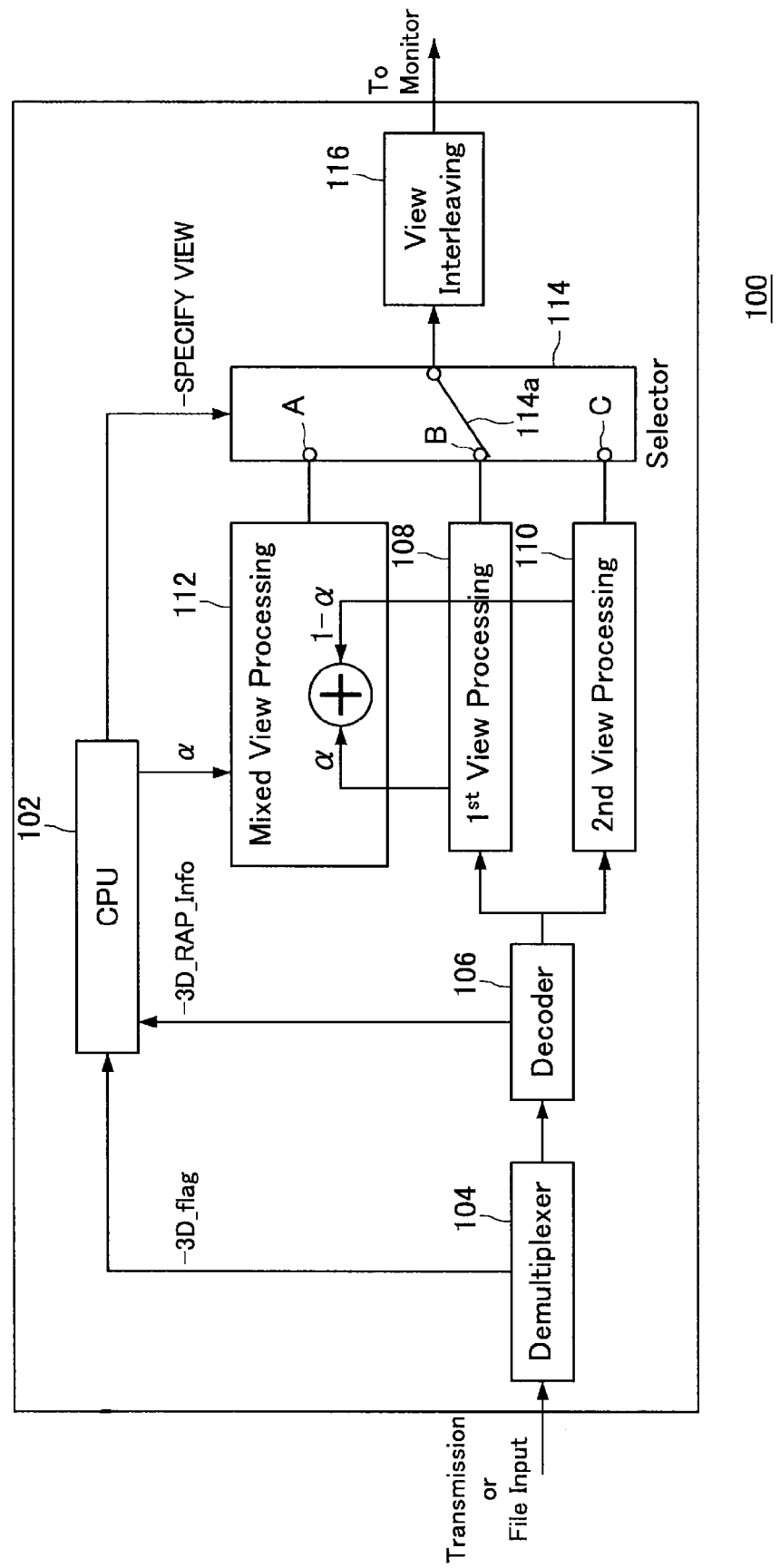
FIG. 7 is a schematic drawing that shows function block configuration of the receiving apparatus.

Next, configuration of the receiver apparatus 100 is described in detail. FIG. 7 is a schematic drawing that shows function block configuration of the receiving apparatus. The receiver includes a CPU 102, a demultiplexer 104, a decoder 106, a 1st view processing 108, a 2nd view processing 110, a mixed view processing 112, a selector 114, a view interleaving 116. Each block shown in FIG. 7 can be configured from a circuit (hardware) or a central processing unit (CPU) and a program (software) that functions them. In this case, the program can be stored in recording medium such as memory that the receiving apparatus 100 has, etc, or external recording medium such as optical discs.

The stream of video data transmitted from the transmitter apparatus is to be input in the demultiplexer 104, and to be separated into video data, audio data, and character information, or the like, and video data is to be input into the decoder 106. When 3D video recorded in recording medium such as DVD is viewed, file input that has been read from the recording medium is input to the demultiplexer 104, and to be processed similarly. Further, 3D_flag that is added to the TS layer is to be sent to the CPU 102 from the demultiplexer 104. Thus, the CPU 102 recognizes that 3D_RAP_Info exists in the coded video, and the information of 3D_RAP_Info is analyzed in the CPU102. The CPU102 controls the 1st view processing unit 108, the 2nd view processing 110, the mixed view processing unit 112, and the selector 114 in order to realize display control between the later-described 2D video and 3D video based on the information of 3D_RAP_Info. This control is realized when the CPU 102 is input with random access, such as channel switching, fast-forwarding, or rewinding, or operational information by signal switching such as starting-up of the receiving apparatus 100. The decoder 106 decodes stream of video data, so as to transmit the image for left eye L to the 1st view processing unit 108, and to transmit the image for right eye R to the 2nd view processing unit 110.

The mixed view processing unit 112 processes mixing image data of 1st view and 2nd view. When mixing, it uses the above-described view mixing value α. α is a value in the range of 0% to 100% and varies according to fixed values or elapse of the time. When mixing the 1st view and the 2nd view, the mixed view processing unit 112 multiplies image data of the 1st view by α, multiplies image data of the 2nd view by (1−α), and adds each results of multiplying to generate mixed view. The generated mixed view is to be output to a terminal A of the selector 114.

Further, data of image for left eye is output to a terminal B of the selector 114 from the 1st view processing unit 108. Data of image for right eye is output to a terminal C of the selector 114 from the 2nd view processing unit 110.

Figure 8:
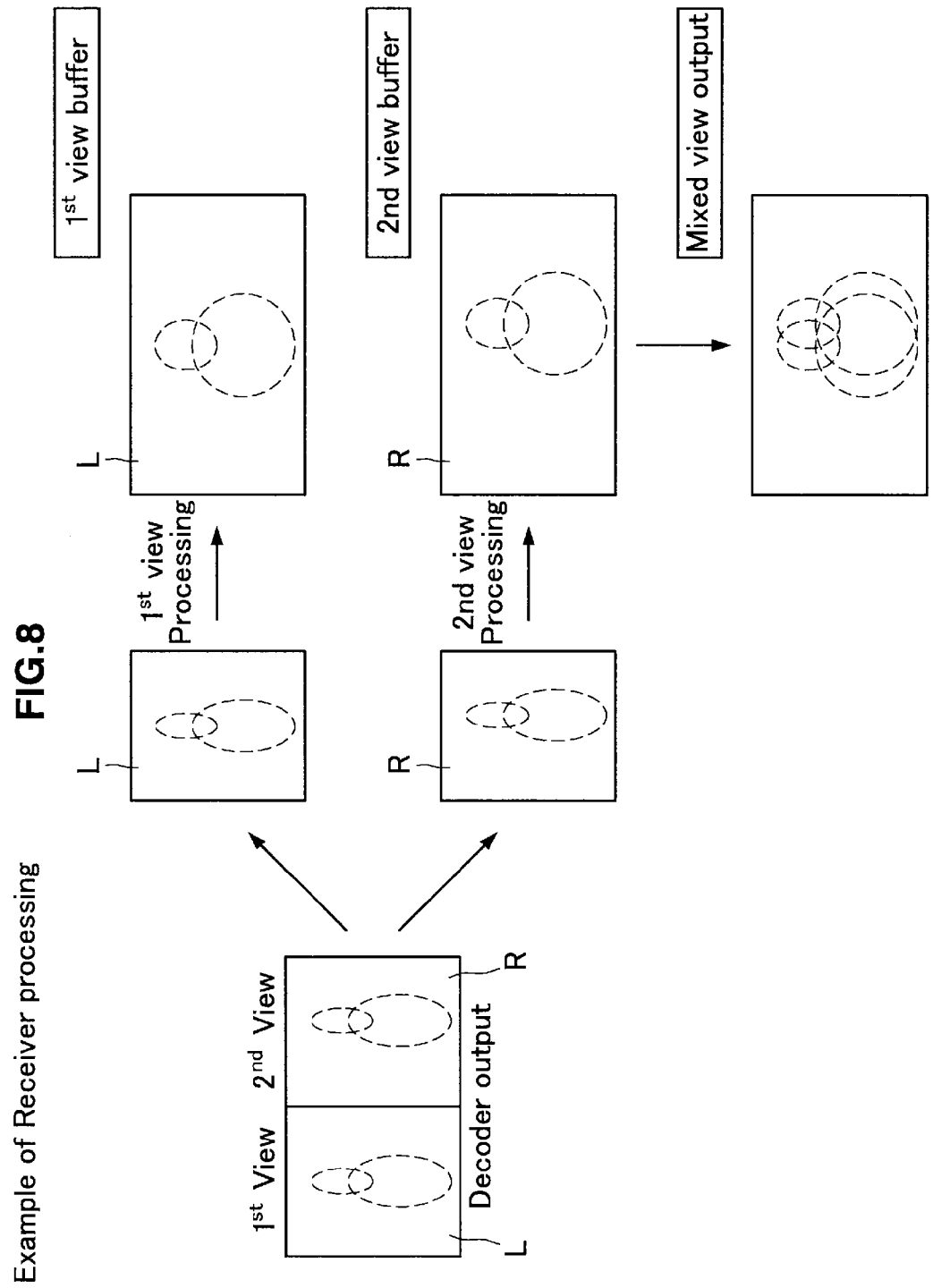
FIG. 8 is a schematic drawing that shows output images from a 1st view processing unit, a 2nd view processing unit, and a mixed view processing unit.

FIG. 8 is a schematic drawing that shows output images from the 1st view processing unit 108, the 2nd view processing unit 110, and a mixed view processing unit 112. Here, it is exemplified a case where an output form the decoder 106 is image data of side-by-side method. As shown in the left part of FIG. 8, the image data output from the decoder 106 (Decoder Output) is data in which the image for left eye L is arranged in the 1st view and the image for right eye R is arranged in the 2nd view. When the data in the 1st view is input in the 1st view processing unit 108, it is processed with interpolation processing in the horizontal direction so that the number of data in the horizontal direction become double, and stored temporarily in a buffer that the 1st view processing unit 108 has, as shown in the right part of FIG. 8. Similarly, when the data in the 2nd view is input in the 2nd view processing unit 110, it is processed with interpolation processing in the horizontal direction, and stored temporarily in a buffer that the 2nd view processing unit 110 has, as shown in the right part of FIG. 8.

Further, the data of the 1st view and 2nd view, which are processed with the interpolation processing in the horizontal direction in the 1st view processing unit 108 or the 2nd view processing unit 110, are input into the mixed view processing unit 112, are multiplied by the above-described a or (1−α) respectively to be added, and output to the selector 114. Therefore, the output data from the mixed view processing unit 112 is, as shown in "Mixed view output" in FIG. 8, the result of addition of data of the 1st view and 2nd view in the ratio corresponding to the value of α.

Figure 9:
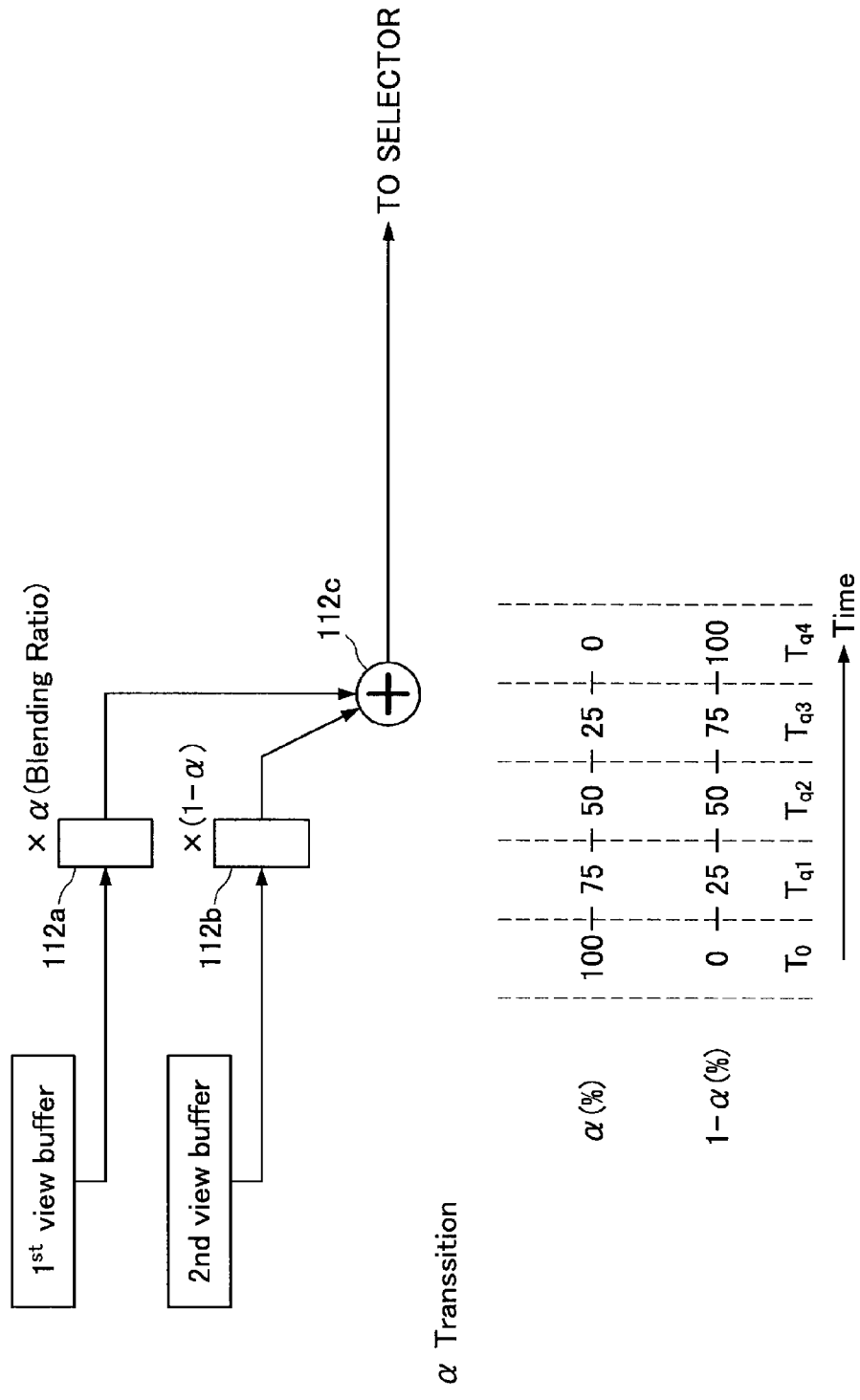
FIG. 9 is a schematic drawing that shows processing in the mixed view processing unit in detail.

FIG. 9 is a schematic drawing that shows processing in the mixed view processing unit 112 in detail. As shown in the upper part of FIG. 9, data stored in 1st view buffer is multiplied by α in a multiplier 112a, data stored in 2nd view buffer is multiplied by (1−α) in a multiplier 112b, and the multiplied data are added in a adder 112c.

Further, the lower part of FIG. 9 shows how the value of α changes according to the time. Thus, the value of α is 100% at $T_0$, and subsequently is decreased linearly (or in a step-by-step manner) as 100→75→50→25→0 as the time elapses $T_{q1} \rightarrow T_{q2} \rightarrow T_{q3} \rightarrow T_{q4}$. Further, the value of "1−α" is 0 at $T_0$, and is increased linearly (or in a step-by-step manner) as 25→50→75→100 as the time elapses $T_{q1} \rightarrow T_{q2} \rightarrow T_{q3} \rightarrow T_{q4}$.

This leads that the value of α is 100% at the time point of time $T_0$, the image for left eye L of the 1st view that has been input into the multiplier 112a is to be output as it is from the mixed view processing unit 112. Subsequently, as time elapses $T_{q1} \rightarrow T_{q2} \rightarrow T_{q3} \rightarrow T_{q4}$, mixture ratio of the 2nd view is gradually increased, and the image for right eye R of the 2nd view is output from the mixed view processing unit 112.

When the selector 114 is in ordinal 3D-display, that is, when the channels are not switched, the switch 114a is connected alternately to the terminal B and the terminal C, and sends the image for left eye L stored in the buffer of the 1st view and the image for right eye R stored in the buffer of the 2nd view alternately to the interleaving 116. The interleaving 116 performs a prescribed processing such as high frame rate with respect to the input image data of the 1st view and the image data of the 2nd view, and output them to the display panel. This leads the display panel to display the image for left eye L and the image for the right eye R alternately. Moreover, at the timing when the crystal shutter 200b of the glasses for observing displayed image 200 is open, the image for the left eye L is displayed, and the image for the right eye R is displayed at the timing when the crystal shutter 200a is open, therefore, user's both of eyes recognize the image for the left eye L and the image for the right eye R which has disparity therebetween, and this realizes 3D-display.

Further, during a period while in 2D-display after switching channels and a period until the fade-in completes for returning from 2D-display to 3D-display (between t11 to t12, t13 to t14, in FIG. 3, or the like), the switch 114a of the selector 114 is connected alternately to the terminal A and the terminal B.

While in 2D-display, the value of α is fixed to 100%. This leads the image for left eye L of the 1st view is output to both of the terminals A and B, therefore, the image that has been sent to the interleaving 116 is only the image for left eye L. Therefore, the interleaving 116 performs the prescribed processing such as high frame rate with respect to the input image data of the 1st view, and outputs it to the display panel. This leads the display panel to display the image for left eye L only alternately at the prescribed frame rate. Moreover, at the timing when the crystal shutter 200b of the glasses for observing displayed image 200 is open, the image for the left eye L is displayed, and the image for the left eye L is displayed also at the timing when the crystal shutter 200a is open, therefore, user's both of eyes recognize the image for the left eye L only which has no disparity, and this realizes 2D-display.

During a period of fade-in for returning from 2D-display to 3D-display, the value of α decreases from 100% to 0 as time elapses. For this reason, the image for left eye L of the 1st view is output at time $T_0$ from the mixed view processing 112, subsequently, the mixture ratio of the 2nd view gradually increases and the image for right eye R of the 2nd view is output at time $T_{q4}$. For this reason, images output from the terminal A changes from the image for left eye L to the image for right eye R between $T_0$ and $T_{q4}$. Meanwhile, from the terminal B, the image for left eye R that is the 1st view is continuously output. Therefore, the switch 114a is connected alternately to the terminal A and the terminal B, and this leads the inter leaving 116 to be input alternately with the output image of the mixed view processing unit 112 which changes from the image for left eye L into the image for right eye R between $T_0$ and $T_{q4}$, and the image for left eye R output from the 1st view processing 108. The interleaving 116 performs a prescribed processing such as high frame rate with respect to the alternately input image data to output to the display panel. This leads the display panel to display the image that changes from the image for left eye L to the image for the right eye R between $T_0$ and $T_{q4}$ and the image for left eye L at the prescribed frame rate alternately. Moreover, at the timing when the crystal shutter 200b of the glasses for observing displayed image 200 is open, the image for the left eye L is displayed, and the image that changes from the image for left eye L to the image for the right eye R between $T_0$ and $T_{q4}$ is displayed at the timing when the crystal shutter 200a is open, therefore, images that is recognized respectively by the user's right eye and left eye gradually generate disparity between $T_0$ and $T_{q4}$, and user can view how the 2D video is switching gradually to the 3D video. This realizes visual effect of fade-in that transitions from 2D-display to 3D-display.

Moreover, during a period of fade-out when 3D-display changes into 2D-display (between t21 to t22, t24 to t25, or the like, in FIG. 4), the value of α increases from 0% to 100% as time elapses. For this reason, the image for right eye R of the 2nd view is output from the mixed view processing 112 at the time point when α=0%, subsequently, the mixture ratio of the 1st view gradually increases and the image for left eye L of the 1st view is output at time point when α=100%. For this reason, images output from the terminal A changes from the image for right eye R to the image for left eye L. Meanwhile, from the terminal B, the image for left eye R that is the 1st view is continuously output. Therefore, the switch 114a is connected alternately to the terminal A and the terminal B, and this leads the inter leaving 116 to be input alternately with the output image of the mixed view processing unit 112 which changes from the image for right eye R into the image for left eye L, and the image for left eye R output from the 1st view processing 108. The interleaving 116 performs a prescribed processing such as high frame rate with respect to the alternately input image data to output to the display panel. This leads the display panel to display the image that changes from the image for right eye R to the image for left eye L, and the image for the left eye L alternately at the prescribed frame rate. This leads the image recognized respectively by user's right eye and left eye gradually loses disparity, and the user can view the state how 3D video gradually switches into 2D video. This realizes visual effect of fade out that transitions from 3D-display to 2D-display.

(6) Display Control by the Receiving Apparatus

Figure 10:
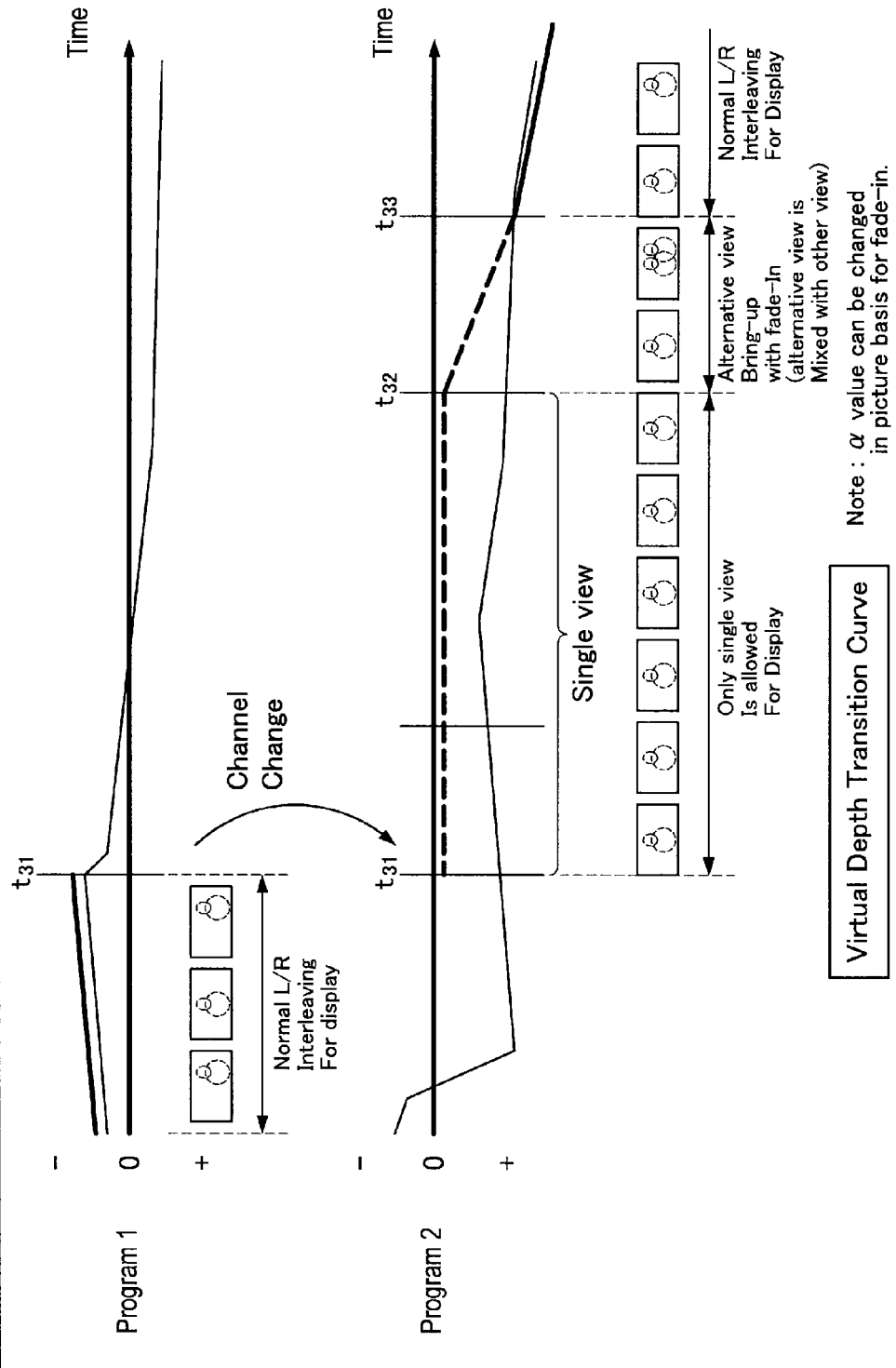

FIG. 10 is a schematic drawing that shows 2D display after switching channels and revertive control from 2D to 3D by following fade-in. Prior to time t31, 3D video by program 1 is received by the receiving apparatus 100, and the image for left eye L and the image for right eye R are displayed alternately.

When the channel is switched to program 2 at time tr31, it will be on single view display until time t32, and the video of program 2 is displayed as 2D video with only one of the views. In the above-mentioned example, 2D video with only the image for left eye L of the 1st view is displayed.

During a period from time t32 to t33 is a period for returning from 2D video to 3D video using fade-in. Here, time $T_0$ described in the lower part of FIG. 9 corresponds to time t32, while time $T_{q4}$ corresponds to time t33. If the value of α is decreased from 100% to 0 between time t32 to t33, data output from the mixed view processing unit 112 changes from the image for left eye L to the image for right eye R. This enables revertive control from 2D video to 3D video using fade-in. After time t33, the image for left eye L and the image for right eye R of program 2 are alternately displayed.

Figure 11:
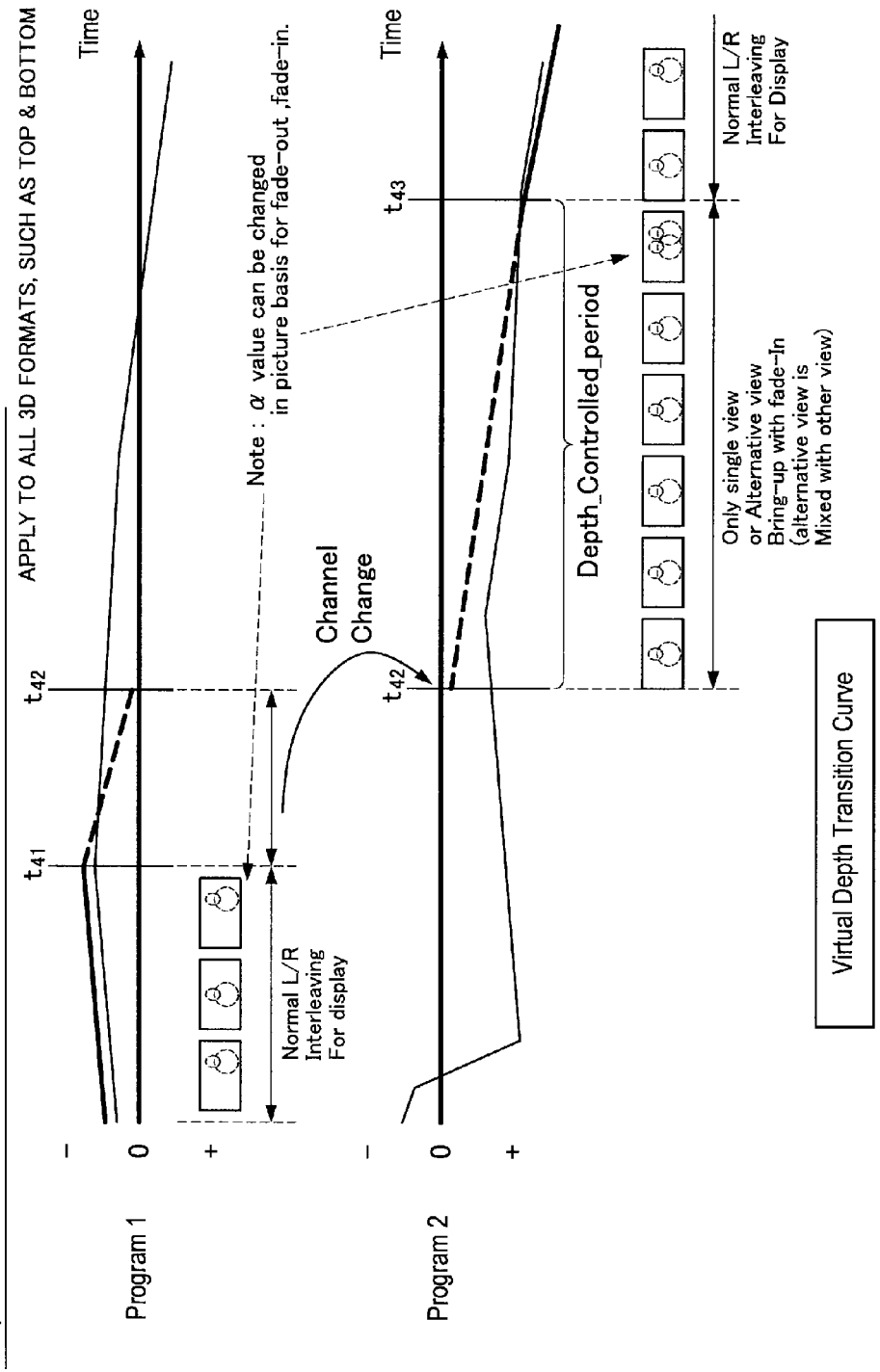
FIG. 11 is a schematic drawing that shows an example where fade-out is performed at a time of switching channels

FIG. 11 is a schematic drawing that shows an example where fade-out is performed at a time of switching channels, described in FIG. 4. In this case, prior to time t 41, 3D video of program 1 is received by the receiving apparatus 100, and the image for left eye L and the image for right eye R are alternately displayed. When a channel switching is directed at time t41, fade-out that transitions from 3D-display to 2D-display is executed during time t41 to t42 while maintaining display of the program 1.

As described above, controlling fade-out can be performed by function opposite to fade-in. The mixed view processing unit 112 of the receiving apparatus 100 performs processing to add data of 1st view and 2nd view while increasing from 0% to 100% the value of α during the period from time t41 to t42. The value of α is assumed 0% at t41, and 100% at t42. Moreover, during this period, the switch 114a of the selector 114a is connected alternately to the terminal A and terminal B. This leads the image for right eye R of the 2nd view to be output from the mixed view processing unit 112 to the terminal A, and the image for left eye L of the 1st view to be output from the 1st view processing unit 108, at the time point of time t41, therefore, the user's eye recognize a stereoscopic video which is configured from the image for left eye L and the image for right eye R. Since the value of α is increased after time t41, output from the mixed view processing unit 112 gradually switches from the image for right eye R of the 2nd view to the image for left eye L of the 1st view. When the value of α becomes 100% at time t42, output from the mixed view processing unit 112 becomes the image of left L of the 1st view, and the image for left eye L of the 1st view is continuously output from the 1st view processing 108, therefore, the video of the program 1 that the user recognizes is 2D video at the time point of t42. Therefore, it becomes possible to realize the display control on fade-out that transitions from 3D-video to 2D video, between time t41 and t42, At time t42 when the video of program 1 becomes 2D using fade-out, actual channel switching from program 1 to program 2 is performed. In an example shown in FIG. 11, after switching channel to program 2, revertive control to 3D video using fade-in is performed between time t42 and time t43. In other words, by decreasing the valued of a so that it becomes α=100% at time t42 and α=0% at time t43, display can be control from 2D to 3D without generating continuous period for 2D display. This enables user's eyes to view 2D video only at a moment at time t42 however, other periods around the exact time is fade-out, or a period of fade-out, therefore, it is possible to realize smooth switching of the depth position of the video when switching from program 1 to program 2.

(7) Configuration Example of a Transmitting Apparatus

Figure 12:
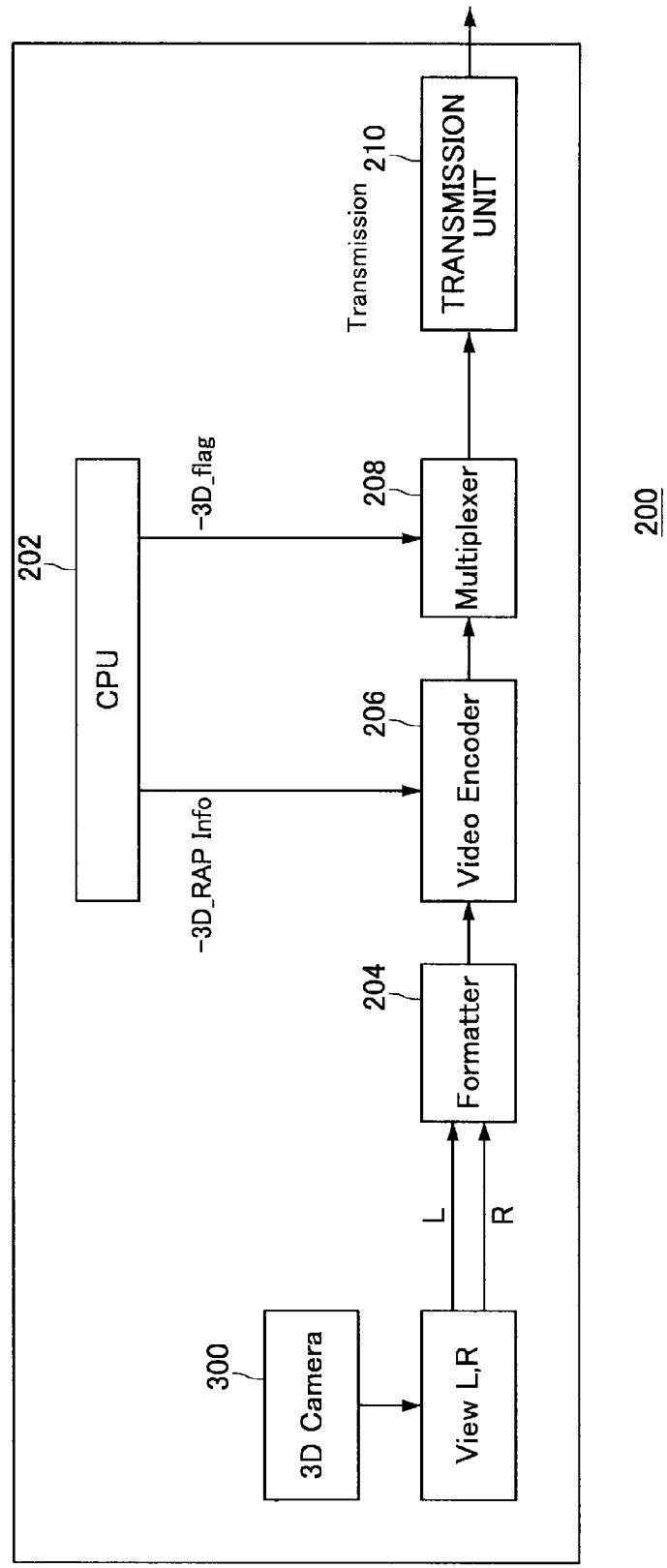
FIG. 12 is a schematic drawing that shows a configuration of a transmitting apparatus.

FIG. 12 is a block view that shows a configuration of a transmitting apparatus. The transmitting apparatus 200 includes a CPU 202, a format unit (formatter) 204, a video encoder 206, a multiplexer 208, and a transmission unit 210. The image for left eye L (View L) and the image for right eye R (View R), which are photographed by a 3D camera 300, are converted in a prescribed format, such as side-by-side, top-and-bottom, or the like, in the format unit 204, and encoded by the encoder 206. 3D_RAP_info is inserted to the codec layer by an instruction from the CPU 202 in the encoder 206.

Data encoded by the encoder 206 is multiplexed along with audio data, character information data, or the like, by the multiplexer 208, and transmitted to the receiving apparatus 100. In the multiplexer 208, 3D_RAP_info is inserted to the TS layer by an instruction from the CPU 202. The transmission unit 210 performs transmitting video signals inserted with 3D_RAP_info to the receiving apparatus 100. Therefore, the transmitting apparatus 200 can insert the control information shown in FIG. 5 into a multiplex layer or a codec layer.

(8) Hardware Configuration Example of the Receiving Apparatus

FIGS. 13 and 14 are schematic drawings that show a hardware configuration of the receiving apparatus. FIG. 13 is a schematic drawing showing an example of a Set Top Box in which the receiving apparatus 100 has a HDMI transmitter unit 206. As shown in FIG. 13, the receiving apparatus 100 includes a CPU 120, a remote control receiver unit 121, a flush memory 122, a DRAM 124, a digital tuner 126, a bit stream processing unit 128, a 3D signal processing unit 130, a video signal processing circuit 132, an audio signal processing circuit 134, and a HDMI transmitter unit 136.

In the configuration of FIG. 12, the bit stream processing unit 128 corresponds to the demultiplexer 104 and the decoder 106 in FIG. 7. Moreover, the 3D signal processing unit 130 corresponds to the 1st view processing unit 108, the 2nd view processing unit 110, the mixed view processing unit 112, the selector 114, and the view interleaving 116 in FIG. 7. Moreover, the CPU 120 corresponds to the CPU 102 in FIG. 7. Audio signals obtained by the bit stream processing unit 128 (demultiplexer 104) are decrypted in the audio signal processing circuit 134. The left and right video data output from the 3D signal processing unit 130 is transmitted to various devices such as a television set, a personal computer, a recording devices in household from the HDMI transmitter unit 136 via a connected terminal 138 along with the audio data decrypted in the audio signal processing circuit 134, after processed with prescribed signal processing in the video signal processing circuit 132.

The bit stream transmitted from the transmitting apparatus 200 is to be received by the digital tuner 126 via an antenna 140. When the user selects a channel using the remote control transmitter unit 142, its information is received by the remote control receiver unit 121 to transmit to the CPU 120. The CPU 120 transmits the channel switching information that has been received in the remote control receiver unit 121 to the digital tuner 126, and switches channels.

Further, FIG. 14 is a schematic drawing showing an example of a case where the receiving apparatus 100 is a television set. The configuration shown in FIG. 14 includes the configuration shown in FIG. 13, as well as a HDMI receiver 150, a panel drive circuit 152, an audio amplifier circuit 154, a display panel 156, and a speaker 158. In this case, the bit stream processing 128 corresponds to the demultiplexer 104 and the decoder 106 in FIG. 7, too. Further, the 3D signal processing unit 130 corresponds to the 1st view processing unit 108, the 2nd view processing unit 110, the mixed view processing unit 112, the selector 114, and the view interleaving 116 in FIG. 7. The left and right video data output from the 3D signal processing unit 130 is transmitted to the panel drive circuit 152, each pixel is driven by control of the panel drive circuit 152, and the video is displayed on the display panel 156. Further, an audio data is amplified in the audio amplifier circuit 154 after being decrypted in the audio signal processing circuit 134, and the audio is output from the speaker 158. The HDMI receiver 150 receives video data, audio data, or the like from devices such as Set Top Box shown in FIG. 13, outputs the video data to the 3D signal processing unit 130, and outputs the audio data to the audio signal processing circuit 134, as well.

As described above, according to the present embodiment, it is possible to display 3D video as 2D video at a time when the video is switched, and to subsequently return to 3D video so that the user does not feel incompatibility or fatigue. Further, it is possible to gradually transition between 3D video and 2D video using fade-in or fade-out when the video is switched so that the user further be free from sense of incompatibility or fatigue.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 100 receiving apparatus
102 CPU
104 demultiplexer
106 decoder
108 1st view processing unit
110 2nd view processing unit
112 mixed view processing unit
126 digital tuner
128 bit stream processing unit
200 transmitting apparatus
202 CPU
206 encoder
208 multiplexer
210 transmission unit

The invention claimed is:

1. A receiving apparatus comprising:
one or more Central Processing Units (CPUs) configured to:
   obtain a video signal including right eye image data and left eye image data;
   obtain display control information that is included in the video signal;
   switch the video signal based on a switching signal that specifies switching videos; and
   control output of the video signal when switching videos based on the display control information,
   wherein the display control information includes information specifying a ratio of the right eye image data and the left eye image data to add to output during a transition period of switching the video signal, and
   wherein the ratio of the right eye image data and the left eye image data is based on an elapse of time from start of the transition period of switching the video signal.

2. The receiving apparatus according to claim 1, wherein the display control information is included in a codec layer that corresponds to a multiplex layer of bit stream of the video signal or a frame of the video signal.

3. A transmitting apparatus comprising:
one or more Central Processing Units (CPUs) configured to:
   code a video signal including right eye image data and left eye image data in a prescribed format;
   transmit the coded video signal to a receiving apparatus; and
   insert, into the video signal, display control information to be used for controlling display when the video signal is switched on a side of the receiving apparatus,
   wherein the display control information includes information specifying a ratio of the right eye image data and the left eye image data to add to output during a transition period of switching the video signal, and
   wherein the ratio of the right eye image data and the left eye image data is based on an elapse of time from start of the transition period of switching the video signal.

4. A communication system comprising:
a transmitting apparatus comprising one or more first Central Processing Units (CPUs) configured to:
   code a video signal including right eye image data and left eye image data in a prescribed format,
   transmit the coded video signal to a receiving apparatus, and
   insert, into the video signal, display control information to be used for controlling display when the video signal is switched on a side of the receiving apparatus; and
the receiving apparatus comprising one or more second Central Processing Units (CPUs) configured to:
   receive the video signal,
   obtain the display control information that is included in the video signal,
   switch the video signal based on a switching signal that specifies switching videos, and
   control output of the video signal when switching videos based on the display control information,
   wherein the display control information includes information specifying a ratio of the right eye image data and the left eye image data to add to output during a transition period of switching the video signal, and
   wherein the ratio of the right eye image data and the left eye image data is based on an elapse of time from start of the transition period of switching the video signal.

5. A method of controlling a receiving apparatus, the method comprising:
   obtaining a video signal including right eye image data and left eye image data;
   switching the video signal based on a switching signal that specifies switching videos; and
   controlling output of the video signal when switching videos based on display control information,
   wherein the display control information includes information specifying a ratio of the right eye image data and the left eye image data to add to output during a transition period of switching the video signal, and
   wherein the ratio of the right eye image data and the left eye image data is based on an elapse of time from start of the transition period of switching the video signal.

6. A non-transitory computer readable medium having stored thereon a set of computer-executable instructions which when executed causes a computer to perform steps comprising:
   obtaining a video signal including right eye image data and left eye image data;
   obtaining display control information that is included in the video signal;
   switching the video signal based on a switching signal that specifies switching videos; and
   controlling output of the video signal when switching videos based on the display control information,
   wherein the display control information includes information specifying a ratio of the right eye image data and the left eye image data to add to output during a transition period of switching the video signal, and
   wherein the ratio of the right eye image data and the left eye image data is based on an elapse of time from start of the transition period of switching the video signal.

7. The receiving apparatus according to claim 1, wherein the display control information includes information specifying which one of the right eye image data or the left eye image data to output during the transition period of switching videos,
wherein the transition period includes a first portion and a second portion, and
wherein the one or more CPUs are configured to control the output of the video signal when switching videos such that only one of the right eye image data or the left eye image data is output a plurality of times without the other one of the right eye image data or the left eye image data being output during the first portion of the transition period based on the display control information.

* * * * *